Jan. 12, 1943.    O. J. SUNDSTRAND ET AL    2,308,216
ACCOUNTING MACHINE
Filed June 27, 1940    5 Sheets-Sheet 1
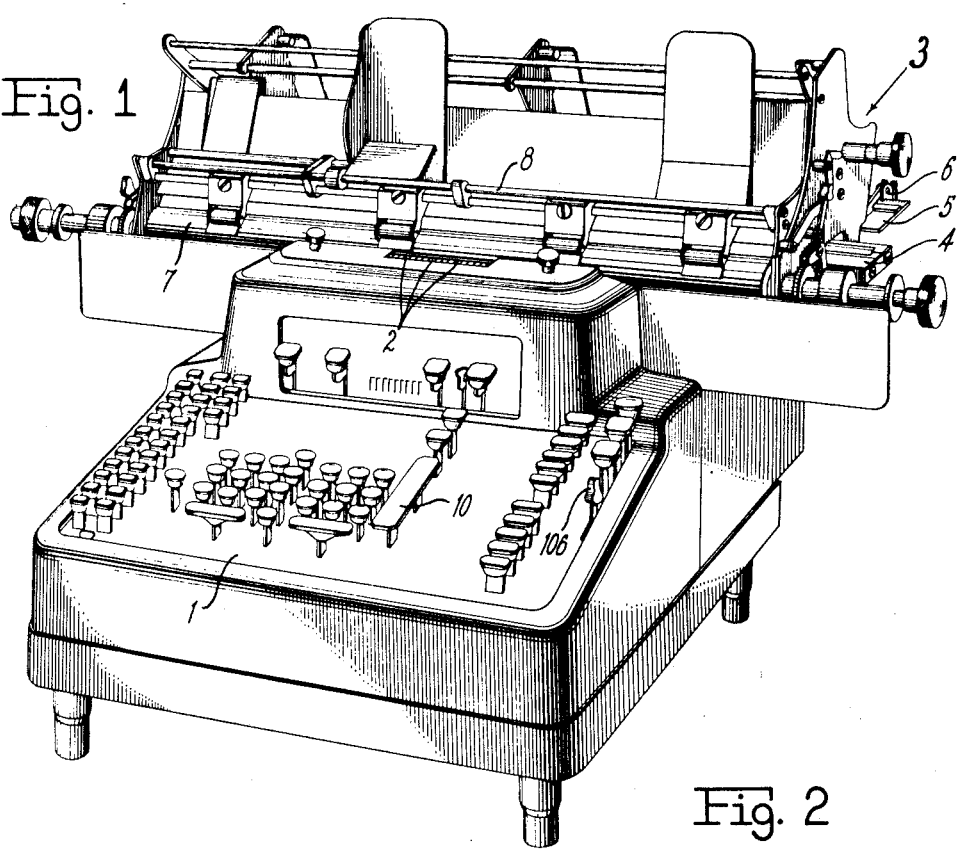
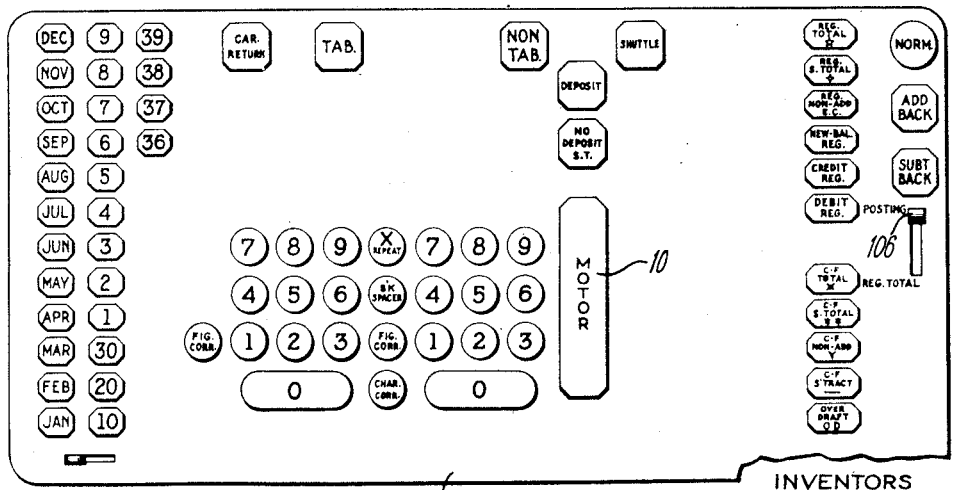
INVENTORS
OSCAR J. SUNDSTRAND
WALTER A. ANDERSON
BY
ATTORNEY

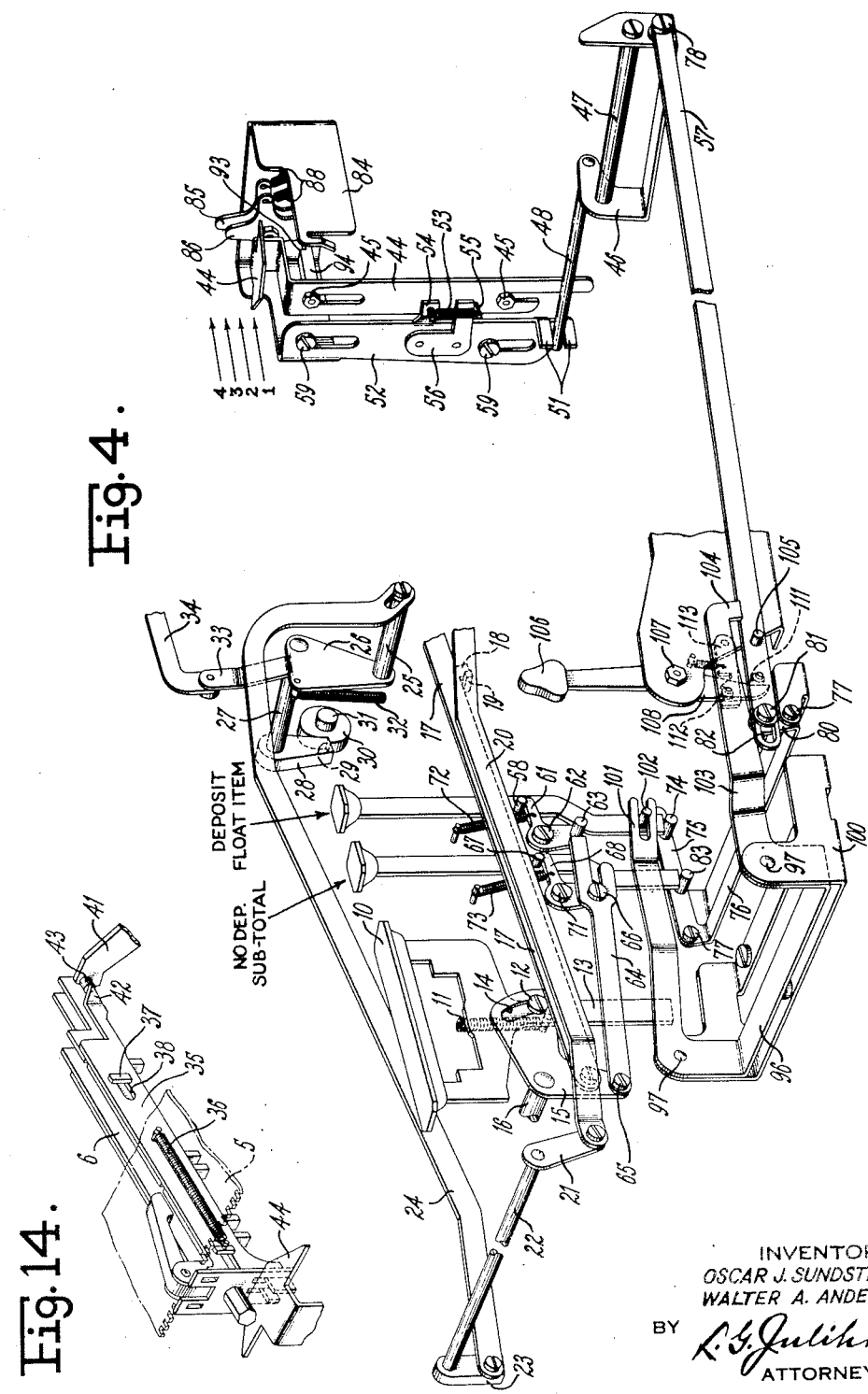

Jan. 12, 1943. O. J. SUNDSTRAND ET AL 2,308,216
ACCOUNTING MACHINE
Filed June 27, 1940 5 Sheets-Sheet 4
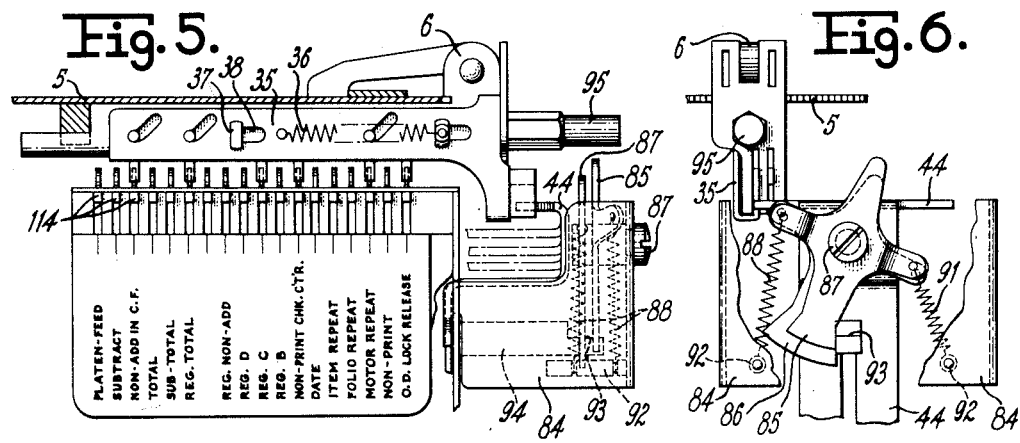
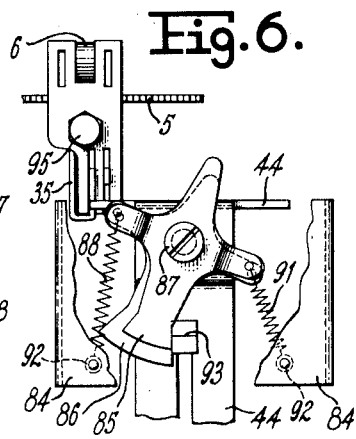
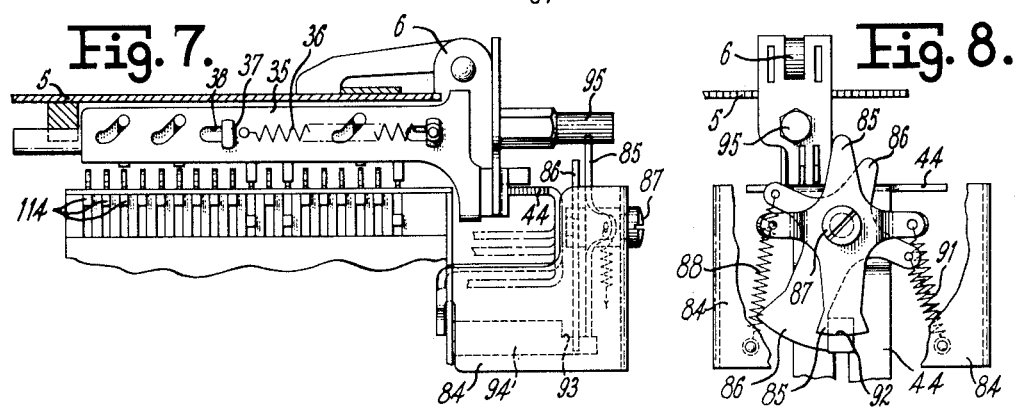
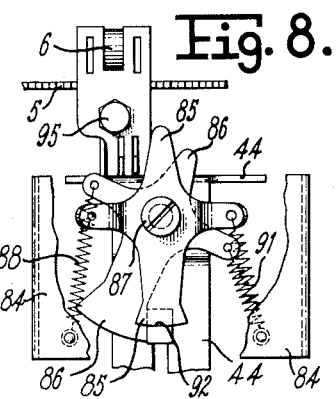
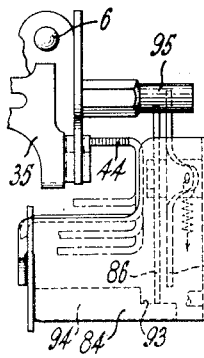
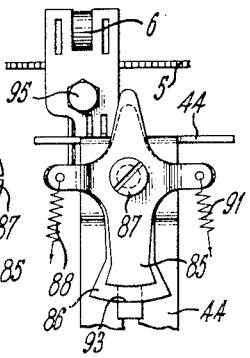
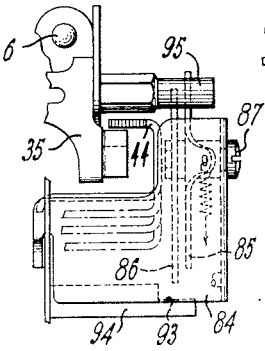
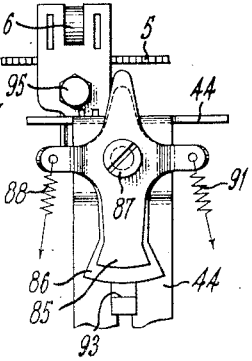
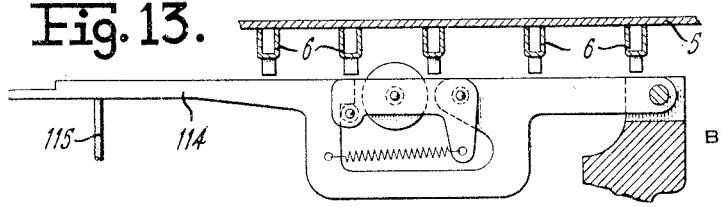
INVENTORS
OSCAR J. SUNDSTRAND
WALTER A. ANDERSON
BY
ATTORNEY

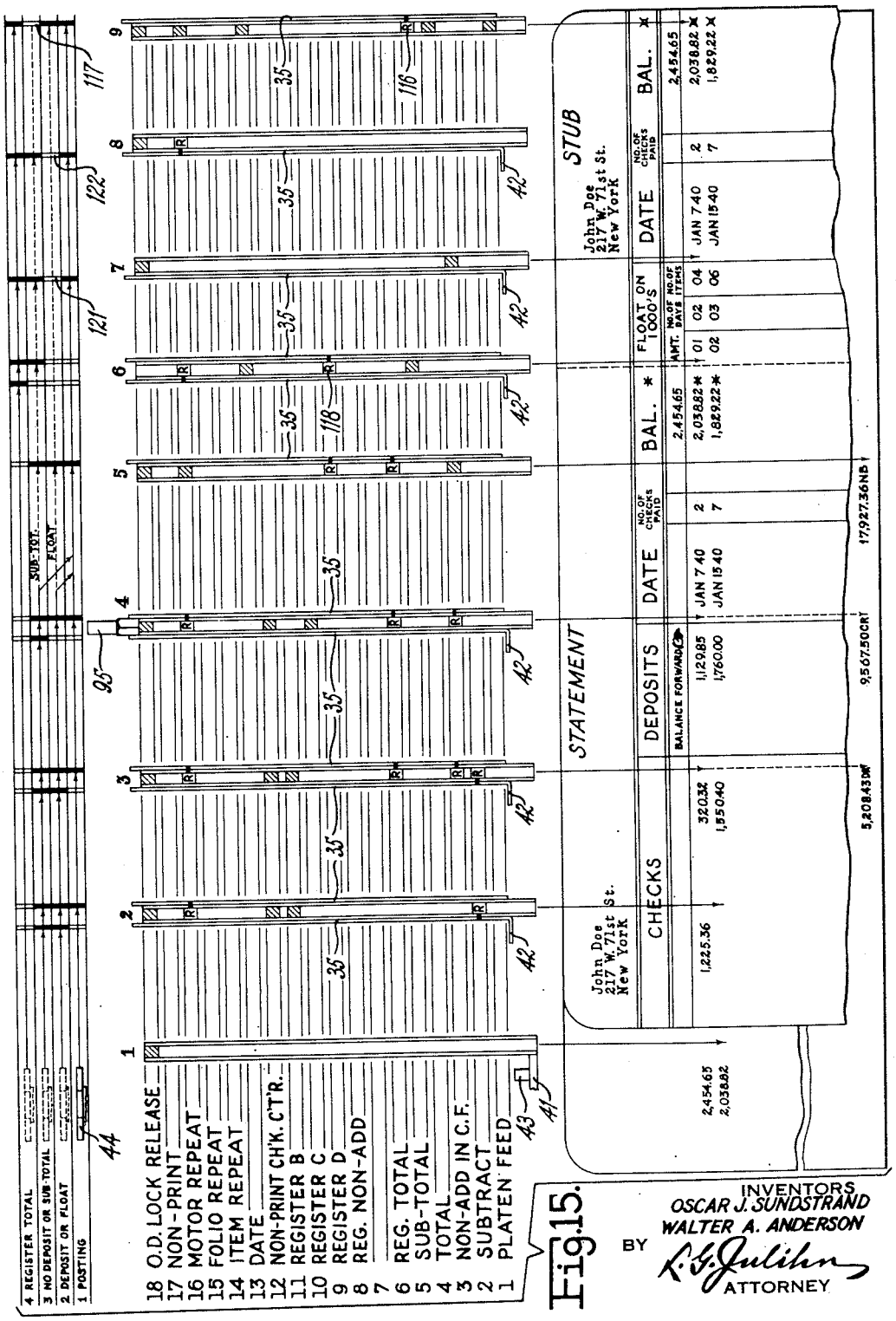

UNITED STATES PATENT OFFICE 2,308,216

ACCOUNTING MACHINE

Oscar J. Sundstrand, West Hartford, and Walter A. Anderson, Bridgeport, Conn., assignors to Underwood Elliott Fisher Company, New York, N. Y., a corporation of Delaware Application June 27, 1940, Serial No. 342,736

2 Claims. (Cl. 235—60)

This invention relates to accounting machines, and more particularly to function controlling mechanism therefor.

As an example of one field of use to which the invention is applicable, reference is made to bank statement posting. In this class of work, the number of items such as checks and deposits posted on a patron's statement varies in accordance with his individual requirements. It is customary to post one or more checks in successive columns and to post the deposits in another column. In many instances, there are fewer checks than the number of columns provided for them, and often there are either no checks or no deposits to be posted.

Two keys are provided to expedite tabulation of the carriage to a desired column. Depression of one of these keys effects express tabulation through check columns to the deposit column. Depression of the other of these keys similarly effects express tabulation from any preceding column through the deposit to the first new balance column.

Often a statement sheet becomes filled before all of the entries for that patron's account have been posted. In such instances, it is desirable to print a sub-total of the new balance upon the completed form instead of the usual total, in order that the total may again be printed at the top of a newly inserted form and the postings continued.

Frequently a single deposit entry represents the value of a check or group of checks on out of town banks, drawn or indorsed to the patron. Modern banking procedure requires that a mean average of the number of days necessary to clear the check or checks be computed and printed, together with the value and number of such items on the statement. These items are commonly called "float items," and the computed record thereof is printed in a special column provided on the stub portion of the form.

It is an object of the present invention to provide a novel arrangement of the mechanism associated with the deposit key whereby when the deposit amount represents a check or group of checks, as above described, the depression of this key after the printing of such amount will effect the stopping of the carriage in the float item column for the listing of the computed clearance data of such deposit tiem, whereas in general operations the carriage will pass through this column.

Another object of the invention lies in the provision of means for latching the control mechanism associated with the deposit and no-deposit keys in effective position immediately upon depression of either key, so that the operator may have the use of his hands for handling the paper while the machine is operating.

A further object of the invention lies in the provision of means for automatically unlatching the control mechanism after the purpose for which the mechanism was latched in effective position has been accomplished.

A broad object of the invention is to provide a control mechanism of the character above set forth which renders the machine generally more automatic in operation and lessens the burden upon the operator of having to depress or hold depressed a selected control key at or until precisely the proper moment in order to effect a desired operation.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

In the drawings—

Figure 1 is a perspective view of an accounting machine embodying the invention, Figure 2 is a diagrammatic view of the keyboard, Figure 3 is a perspective looking from the left rear corner of the machine, showing the automatic control mechanism on the traveling paper carriage, Figure 4 is a perspective taken from the right front corner of the machine, and showing the mechanism for adjusting the automatic control cam, Figure 5 is a right side elevation of a control cam in normal or posting position, Figure 6 is a rear elevation of the parts shown in Figure 5, Figure 7 is a view similar to Figure 5 but with the control cam latched in that elevation to which it is adjusted by depression of the deposit key, Figure 8 is a rear elevation of the parts shown in Figure 7, Figure 9 is a view similar to a portion of Figure 7, but with the control cam latched in that elevation to which it is adjusted by depression of the no-deposit key, Figure 10 is a rear elevation of the parts shown in Figure 9, with the control cam shown in that elevation to which it is adjusted by movement of an automatic register total lever to register total position, Figure 12 is a rear elevation of the parts shown in Figure 11, Figure 13 is a detail view of one of the selector levers operated by the carriage controls, Figure 14 is a detail perspective of a control magazine and a portion of the conventional tabular stop mechanism associated therewith, and Figure 15 is a diagrammatic showing of the carriage controls in all nine columns, together with a sample statement sheet.

General description

The present mechanism is shown as applied to a machine of the type fully disclosed in U. S. Patent No. 2,194,270, of Oscar J. Sundstrand. It is an improvement on the machines disclosed in the U. S. applications Serial Nos. 92,164 and 216,465 of Walter A. Anderson, filed July 23, 1936, and June 29, 1938, respectively.

The machine includes one crossfooter and four adding registers. It has a traveling paper carriage movable laterally to different columns and automatically returnable from a predetermined lateral position. The carriage includes a control plate carrying a series of magazines having lugs for automatically controlling the numerous operations that may be controlled manually by the keyboard. The carriage illustrated in the drawings is of the combined front and rear feed type.

Selection of the adding registers is performed by selective depression of three keys on the right side of the keyboard. Totals are taken from the adding registers by depressing the proper selecting keys, operating the machine through a blank cycle, then depressing the register total key and again operating the machine. Sub-totals are taken from the adding register in the same manner as totals, except that the register sub-total key is depressed instead of the total key.

Register totals may be automatically taken at the end of a series of posting operations by structure similar to that disclosed in application Serial No. 92,164.

Movable spring tensioned slides are mounted on opposite sides of the carriage control magazines and arranged to be actuated by a vertically adjustable control cam. These slides, in turn, actuate the control lugs placed in the magazines to effect the desired operations of the machine in predetermined columns. Certain of these slides are provided with offset cams arranged, when moved forwardly, to depress the conventional carriage stop, thereby causing the carriage to skip certain columns in instances where the control cam is adjusted to an elevation for engaging such slides.

The control cam is elevated different extents by the deposit and no-deposit keys and by the automatic register total lever. When this lever is in posting position, and neither of the above keys is depressed, the cam occupies its lowermost or normal position. When the cam is in this position, the carriage, as it travels from right to left on its working stroke, stops at each column except the float item position. Depression of the deposit key raises the cam one step of movement into the plane of slides on the magazines in the check columns, allowing the carriage to tabulate directly to the deposit column. Depression of the no-deposit key raises the cam two steps of movement, again into the plane of the slides on the magazines in the check columns and also into the plane of the slides on the magazine in the deposit column, allowing the carriage to tabulate directly through these columns.

Movement of the register total lever from posting to register total position raises the cam three steps of movement, in which position it cooperates with certain of the magazine slides to condition the machine for taking register totals automatically. In this plane, slides associated with balance printing and float item operations are engaged by the cam, causing the carriage to skip these columns.

Normally, as the carriage travels from right to left on its working stroke, the control cam is free to be raised or lowered by either the no-deposit or deposit key. However, when either key is depressed, the cam is held in its moved position by a spring tensioned latch corresponding to the depressed key. The cam will remain so held until the carriage reaches the deposit column, there being a projection on the deposit magazine that trips the latch, permitting the cam to restore to normal position.

If neither key is depressed after the carriage reaches the deposit column, the carriage tabulates to the first balance column, for sub-total printing of the balance, skips the float item column, and tabulates to the last balance column for total printing of the balance.

If the deposit key is depressed after the carriage has passed through the deposit column, but before it reaches the float item column, the cam again latches in the position to which it is raised by the deposit key, and causes the carriage to stop in the float item column.

If the no-deposit instead of the deposit key is depressed at this time, the cam latches in the position to which it is raised by depression of the no-deposit key and effects the printing of a sub-total instead of a total in the last balance column.

During the return stroke of the carriage, the projection on the deposit magazine disengages the latch, permitting restoration of the cam to normal position ready for the posting operations on the next working stroke.

Detailed Description

Index of topics

Figure 3:
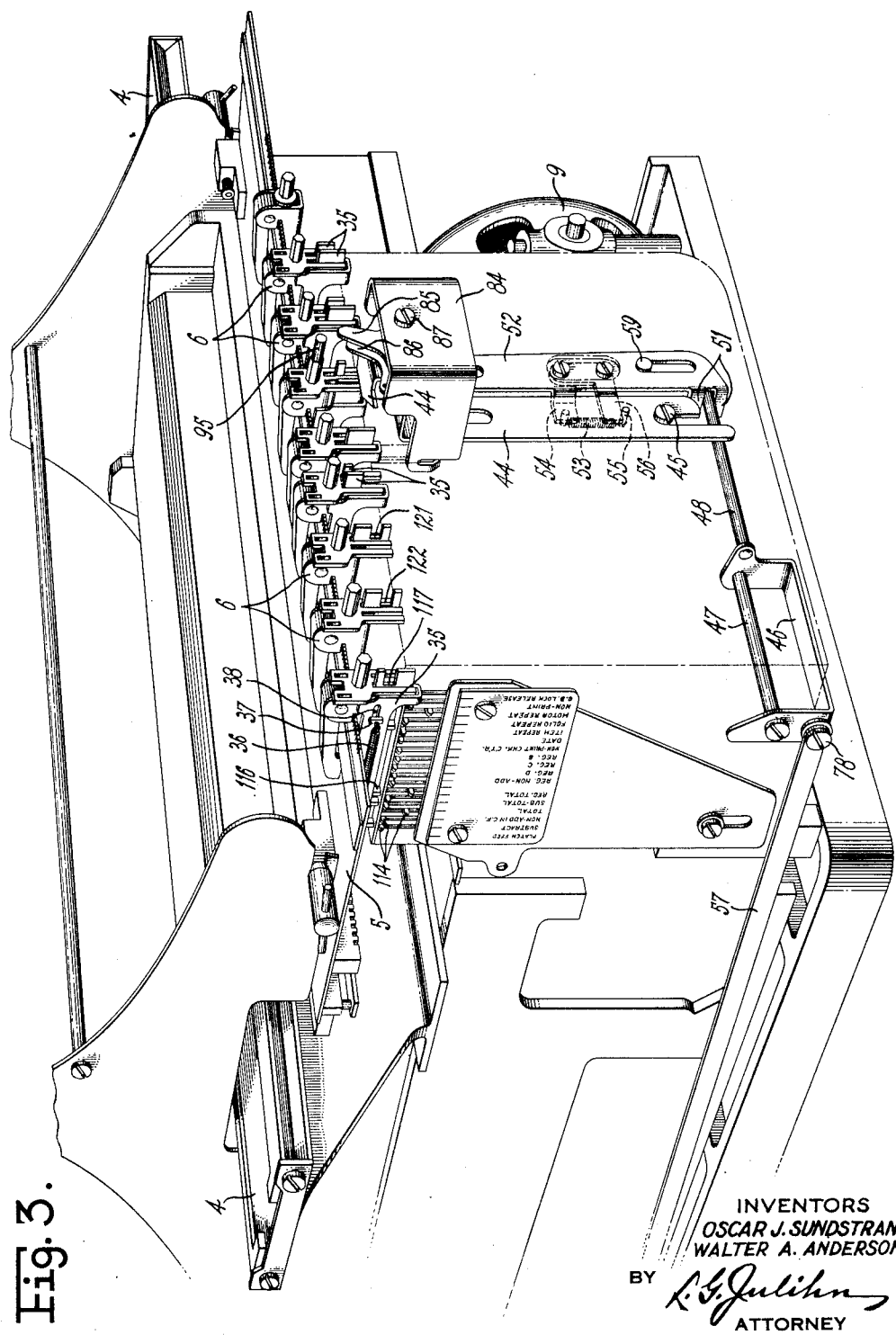

1. Machine sections and operating mechanism.
2. Carriage tabulating mechanism in general.
3. Carriage tabulation by the deposit and no-deposit keys.
4. Automatic printing of totals from registers.
5. Taking a sub-total by depression of the no-deposit key.
6. Effecting carriage stop in float item column by depression of deposit key.

1. *Machine sections and operating mechanism*

Referring to Figure 1, the machine includes the customary keyboard 1, type bars 2, a laterally movable paper carriage indicated generally at 3 mounted on a track 4. The carriage has secured to it a control plate 5 carrying a plurality of control magazines 6 for automatically controlling the operations of the machine in predetermined columns. The carriage may be of the type disclosed in my co-pending application Serial No. 150,637, filed June 25, 1937. The carriage also carries the customary type of roller platen 7. Work sheets may be inserted around the platen from the rear thereof in the customary manner, and other sheets may be inserted from in front of the platen by the aid of a front feed structure 8.

The manual means for controlling such functions as selection of the registers, subtraction, non-addition, total taking and sub-total taking are located at the right side of the keyboard (Figure 2). The mechanism for performing these various operations is fully disclosed in Patent No. 2,194,270.

The machine is actuated by an electric motor 9 (Figure 3). The motor is started by the closing of a suitable switch mechanism (not shown) upon depression of a motor bar 10 (Figure 1). Depression of the motor bar also releases a clutch mechanism to engage the motor with the main drive shaft.

Referring to Figure 4, the motor bar 10 is mounted in the machine frame for vertical movement, and is held in its upper position by a spring 11. A stud 12 on the stem 13 of the motor bar rests normally in the bottom of a slot 14 in a lever 15 pivoted at 16 to the machine frame. A link 17 is pivoted to the lower arm of lever 15 and extends toward the rear of the machine. A shoulder 18 on link 17 lies behind a block 19 on another link 20, connected at its forward end to an arm 21 secured to a shaft 22 extending across the front of the machine. An arm 23, also secured to shaft 22, is pivoted to a link 24 connected at its rear end, by pin and slot connection, to a stud 25 secured to a plate 26 pivoted on a shaft 27. An arm 28 secured to shaft 27 normally lies above a shoulder 29 on a cam 30 secured to a release shaft 31. A spring 32 secured to plate 26 normally holds these parts in the positions shown. An arm 33 extends upwardly from plate 26 and is connected to a link 34 extending toward the rear of the machine.

Depression of the motor bar oscillates lever 15 and pulls link 17 forward. Shoulder 18 pulls link 20 forward, rocking shaft 22 and pulling link 24 and plate 26 forward against the tension of spring 32. This rotates shaft 27, removing arm 28 from shoulder 29 and moving link 34 to the rear. The removal of arm 28 from shoulder 29 engages the clutch, and the movement of link 34 starts the electric motor in the manner disclosed in Patent No. 2,194,270. The starting of the motor, together with the engaging of the clutch, causes the machine to operate. The parts are returned to their normal positions at the end of the operation in the same manner as disclosed in Patent No. 2,194,270.

2. *Carriage tabulating mechanism in general*

Referring to Figure 3, the control plate 5 is attached to the rear of the paper carriage to move therewith, and carries a number of control magazines 6. Certain of these magazines are provided with control slides 35 on opposite sides thereof. These slides are mounted for sliding movement on the magazines, and are tensioned by springs 36 (see also Figure 14) toward the rear of the machine, their rearward movement being limited by studs 37 extending through slots 38 in the slides. A tabular stop lever 41 (Figure 14), pivoted in the machine frame, normally lies in the path of lateral movement of the forward ends of control magazines 6 to stop the paper carriage in its several columnar positions.

Normally, as disclosed in Patent No. 2,194,270, this lever and its associated mechanism (not shown) are operated during each machine operation to allow the carriage to advance one column. However, since it is desirable at times that one or more columns be skipped, skip cams 42 are provided on certain of the slides 35 to cooperate with a stud 43 on lever 41 to depress the lever from the path of the magazine to which the slide is attached.

By this mechanism, when it is desired to skip a particular column, it is only necessary to move slide 35 for that column forward a sufficient distance to place cam 42 in alignment with stud 43. Then as the carriage enters that column, lever 41 is depressed, allowing the carriage to move to the next column without stopping.

The means for moving the slide forward includes a control cam slide 44 mounted on studs 45 for vertical movement. When it is desired to move one of the slides 35 forward, it is only necessary to place cam slide 44 in the horizontal plane of that slide. Then, as the carriage travels into that column, the slide is cammed forward just before it reaches such column. Movement of cam slide 44 is controlled by a bail 46 (Figure 3) pivoted on a rod 47 and having a long stud 48 lying between fingers 51 (Figure 4) formed on a latch slide 52 mounted for vertical movement on studs 59. A spring 53, connected between an arm 54 on slide 52 and a stud 55 fixed on slide 44, yieldingly connects the sides, for uniform movement. A stop 56 fixed on slide 52 bears against stud 55 to limit movement by the spring.

From these parts it is obvious that oscillation of bail 46 will raise or lower cam slide 44 into or out of the path of slides 35. Movement of the slide is regulated by a link 57 extending to the front of the machine. The adjustment of these parts under control of link 57 will be explained later.

3. *Carriage tabulation by the deposit and no-deposit keys*

Two keys entitled deposit and no-deposit are provided for selective column skipping to speed the posting operations and to require less manipulation by the operator. The deposit key, when depressed, causes the machine to tabulate from any column on the left of the statement sheet (Figure 15) directly to the deposit column. This key is useful in instances where there are no checks, or fewer checks than the number of columns allocated thereto, and a deposit is to be entered. The no-deposit key causes the machine to tabulate directly from any position on the left side of the statement sheet to the blank cycle (No. 5) magazine for preparing the machine to print the new balance. This is useful where there is no deposit.

To further simplify the manipulations necessary in this work, these keys are provided with connections to the clutch release mechanism so that depression of either key will act as a motor bar.

By this provision, when the amount of the old balance or check is set up on the amount keyboard, it is only necessary to depress the deposit or no-deposit key to cause the machine to enter, in the appropriate column, the amount set up in the keyboard, and to then tabulate directly to the deposit or blank cycle magazine, depending upon which of the two keys is depressed.

The connections for starting the machine by these keys and for skip tabulating the carriage will now be explained.

Referring to Figure 4, a stud 58 is secured to the stem of the deposit key and lies above a bell and has a stud 63 lying behind the rear end of a pitman 64 pivoted at 65 to the lever 15. Pitman 64 is slidable at its rear end on a stud 66. Depression of the deposit key will thereby move pitman 64 forward and rock lever 15 to start the machine, as above explained.

A stud 67 on the stem of the no-deposit key lies above an arm of a bell crank 68 pivoted at 71 and having stud 69 secured on its lower arm. By these connections, depression of the no-deposit key also moves pitman 64 forward to rock lever 15 and start the machine. The deposit and no-deposit keys are held in their normal positions by springs 72 and 73 fastened to bell cranks 61 and 68 and to the frame of the machine. It will be noted that these keys have no latches to hold them depressed.

The lower end of the deposit key stem lies above a stud 74 on an arm 75 of a bail 76 pivoted at 77. An arm 80 extends upwardly from the opposite end of the bail and carries a stud 81 extending through a slot 82 in link 57. Link 57 is connected to bail 46 by a stud 78. By these connections, depression of the deposit key moves link 57 a step to the rear, and elevates slides 52 and 44 from their lowest or normal position one step of movement to their No. 2 position.

To tabulate the carriage directly to the blank cycle (No. 5) magazine by depression of the no-deposit key, a stud 83 (Figure 4) is attached to arm 75 at a point midway between stud 74 and pivot 77, and directly under the lower end of the no-deposit key stem. By this construction, depression of the no-deposit key raises slides 52 and 44 about twice as far, elevating the slides to their No. 3 position (Figures 4 and 15).

In order to further lessen the burden upon the operator in performing these carriage tabulations, a mechanism is provided for latching the control cam in either of the positions to which it may be elevated. This latching mechanism will now be explained.

Referring to Figures 3 and 4, the upper end of slide 52 is formed with a housing 84 enclosing the upper end of cam slide 44. A pair of latches 85 and 86 are pivoted on a stud 87 (Figure 5) fixed in this movable housing. These latches are substantially identical in shape, but a depending arm of latch 85 is shorter than a depending arm of latch 86. Each latch has oppositely disposed horizontal arms that are connected by springs 88 and 91 to studs 92 in housing 84. The springs 88 and 91 exert an equal tension upon the latches and normally tend to urge them into perpendicular position. When, however, slides 44 and 52 are in their normal position, the depending arms of the latches, under the tension of springs 88, bear against a shoulder 93 of a stud 94 fixed on the machine frame, as shown in Figures 5 and 6.

By these parts, when the deposit key is depressed and the slides move to their No. 2 position as above described, the depending arm of latch 85 latches over shoulder 93 to hold cam slide 44 in this position, as shown in Figures 7 and 8.

Referring to the top of Figure 15, opposite the designation "Deposit or float," it will be observed that when cam slide 44 is held in the No. 2 position, it is lying at an elevation to be in the path of the rear ends of the left and right control slides in the second and third columns. Since, as also indicated in Figure 15, the left control slides in these columns are each equipped with skip cams 42, the carriage will be tabulated directly to the fourth or Deposit column.

By this means, when the carriage is at rest in the first column, depression of the deposit key will start the machine to enter the old balance set up on the amount keyboard, and then cause the carriage to tabulate until it reaches the deposit column. At this time an extended stud 95 secured on the deposit magazine strikes an upwardly extending projection on latch 85, swinging it clockwise about pivot 87 and allowing the parts to restore to normal position. The operator may now index the amount of the deposit on the keyboard and cycle the machine to proceed with the balance printing operations.

Similarly, when the no-deposit key is depressed, the depending projection of latch 86 latches over shoulder 93 to hold cam slide 44 in the No. 3 position, as shown in Figures 9 and 10. Referring to Figure 15, it is seen that when the cam is held in this position, it lies in the path of the rear ends of left control slides 35 in the second, third and fourth columns. As soon as the carriage reaches the fourth column, stud 95 strikes an upwardly extending projection on latch 86 and trips the latch to permit slides 52 and 44 to restore to the normal position shown in Figures 5 and 6. Since the magazine in the fifth column has no skip cam slide, the machine will stop in this column, execute a blank cycle, and tabulate to the first balance column.

If the deposit or no-deposit key should be depressed while the rear end of a control slide 35 lies above cam 44, preventing its upward movement, slide 52, by virtue of the yielding connection of spring 53, will rise and latch in the proper position. Then, when control slide 35 moves past cam 44 during tabulation, the cam rises until stud 55 strikes stop 56, arresting the cam in position to effect the desired control.

If the deposit key should be abruptly depressed, slides 52 and 44 might be thrust upwardly past the desired No. 2 position and latch 86 become effective to hold the slides in their No. 3 position. To prevent such misoperation, the following parts are provided. Referring to Figure 4, a bail 96 is pivoted at 97 in a frame 100 fixed on the machine. One arm 101 of this bail has a yoke embracing a pin 102 fixed on the deposit key stem. The opposite arm 103 is provided with a stop 104 normally lying above the path of a pin 105 on link 57. Upon depression of the deposit key, bail 96 rocks clockwise about pivots 97, lowering stop 104 into the path of pin 105. In this position, stop 104 prevents overthrow of link 57 and insures controlled movement of the associated slides.

4. Automatic printing of totals from registers

At the end of a day's posting, it is desirable for the operator to take the totals from the B, C and D accumulating registers. This operation is performed by moving the register total lever 106 (Figure 2) from its posting to its register total position and by depressing the motor bar 10. The mechanism for performing this function will now be described.

The lever 106 is pivoted at 107 (Figure 4) and has a downwardly extending arm 108 lying in front of a pin 111 on link 57. A roller 112 on arm 108 cooperates with a spring-pressed detent 113 to hold the register total lever in either of its positions. Movement of this lever to its register total position shifts link 57 a considerable distance to the rear, raising cam slide 44 to its highest, or No. 4 position shown in Figures 11 and 12.

Referring now to Figure 15, when cam slide 44 is in its register total position, it is above, and therefore does not contact the control slides 35 on the 2nd, 3rd, 4th and 5th magazines. Hence, the carriage stops in each of these columns for an operation. Non-operation of the right slides 35 of these magazines allows certain of the lugs contained therein, which are normally retracted when cam 44 occupies its other positions, to remain operative and thereby condition the machine for taking totals from the B, C and D registers. Since the left control slides 35 on the 6th, 7th and 8th magazines are provided with skip cams 42, and are operated when cam 44 is elevated to register total position, these columns are skipped following the printing of the D register total in the fifth column. A cycle that is, in effect, a blank cycle, occurs in the ninth column, and the carriage then continues for a short distance toward the left, from which point it is automatically returned. The sequence of the total taking operations is as follows, reference being had to the control lug designations numbered 1 to 18 on the left of Figure 15.

Assuming the carriage is at rest in the first column, the motor bar is struck, advancing the carriage to the second column, wherein the right control slide being unoperated, a motor repeat lug remains operative and causes the machine to take a blank cycle during which the B register is engaged. Following this, the carriage advances to the third column, where motor repeat and register total lugs similarly remain operative and cause the total in the B register to be printed. The carriage then advances to the fourth column, wherein motor repeat and register total lugs remain operative. These lugs, together with a stationary C register lug, cause the total in the C register to be printed, whereupon the carriage advances to the fifth column. This fifth column magazine which is normally, during posting operations, a blank cycle magazine, is now utilized as a total taking magazine for the D register, the D register and register total retracting lugs therein remaining operative, and the stationary motor repeat lug causing the machine to cycle. Following this, the carriage skips through the sixth, seventh and eighth columns and cycles in the ninth column. The carriage is then returned for the next series of operations.

The mechanism for retracting the control lugs is illustrated in Figures 5 and 14. These figures show certain of the control lugs having pins extending from their sides and lying in small cam slots in control slide 35. It is apparent that the control lug will be retracted by forward movement of the slide.

The manner in which the lugs control the machine operations is more clearly illustrated in Figure 13 where it will be observed that movement of the carriage into a columnar position causes the control lugs to depress corresponding levers, such as 114, which in turn depress corresponding rods, such as 115. These rods operate various mechanisms to control the functions indicated in the 18 control positions in Figures 5 and 15. The mechanism for so controlling the machine functions, together with details of the mountings of the movable control lugs, are fully disclosed in the above mentioned patent and applications.

5. *Taking a sub-total by depression of the no-deposit key*

In some instances, one statement sheet accommodates all the postings to be made on one account, and in other instances, a second sheet is necessary. In the first instance, it is desirable to print a sub-total of the new balance in the second new balance column of the completed form and a total of this amount on the top of the new form in the balance forward space thereof. In the second instance, it is desirable to print sub-totals on both the completed form and the new form to eliminate a second indexing of the new balance amount before proceeding with the posting operations.

A retractable crossfooter sub-total lug 116 is provided in the magazine of the ninth (second new balance) column (Figure 15). This lug 116 is retracted (elevated to inoperative position) by movement of slide 35 to the left (Figure 3) by cam 44. When cam 44 is in its posting, deposit or register total elevations, slide 35 of this magazine is so moved, and therefore sub-total lug 116 is retracted so that new balances will be printed as totals in this column. When, however, the no-deposit key is depressed after the carriage has passed through the deposit column and before it reaches the last new balance column (or is held depressed while it passes through the deposit column), cam 44 is again latched in its no-deposit elevation by latch 86. When the cam is so held by the latch, it lies in the path of a slot 117 in slide 35 of the ninth column magazine. Hence, when the no-deposit key is so operated, slide 35 is ineffective to retract lug 116, permitting a sub-total instead of a total to be taken. The carriage then returns to the first column.

During this return stroke, when stud 95 strikes the upward projection of latch 86, the latch pivots counter-clockwise about stud 87, permitting cam 44 to restore to normal position. The depending arm of latch 86 now bears against the right side of shoulder 93 under the tension of its corresponding spring 91. Following this, the completed form is removed and a new form inserted.

In the event that no immediate posting operations are to follow, and it is merely desired to carry forward the amount of the new balance in order for the new form to be ready for future posting operations, the no-deposit key is again depressed, again latching the cam in its No. 3. position. As the carriage reaches the deposit column, stud 95 again releases latch 86, allowing cam 44 to drop to its No. 1 position, and the carriage stops in the fifth column, wherein a blank cycle is taken and the new balance is then printed, first as a sub-total and then as a total as in normal posting operations.

If the transfer of the new balance is to be immediately followed by further posting operations, a sub-total is taken upon the completed form in the manner described above, a second statement sheet is inserted, and the no-deposit key is held depressed until after the carriage has passed through the deposit column, so that cam 44 may remain latched in its No. 3 position while the machine operates in the ninth column. The second printing of the new balance on this sheet will therefore be a sub-total instead of a total, so that the posting may be continued.

New balance amounts are accumulated in the D register by virtue of a lug 118 in the magazine in column six. It is apparent that unless this lug is rendered ineffective during these operations a sub-total instead of a total, the balance will be entered in this register twice instead of once. To prevent this, the right control slide of this magazine is arranged to retract lug 118 when cam 44 is relatched in its no-deposit elevation after the carriage has traveled through the fourth column.

6. Effecting carriage stop in float item column by depression of the deposit key As before stated, a deposit amount frequently represents a single check or group of checks on an out-of-town bank. In such instances it is desirable to have a listing of computed clearance data recorded in the float item column provided in a stub portion of the statement form. Since these float item entries are made on only a portion of the accounts, it is desirable to have the carriage stop in this column in some instances, and tabulate through it in others.

The magazine (Figure 15) in the seventh or float item column is provided with a slide 35 having a skip cam 42 on the forward end thereof. The rear end of this slide is provided with a slot 121 which lies in the path of control cam 44 when the cam is latched in its deposit elevation. When cam 44 is so latched by depression of the deposit key following tabulation through the deposit column, slide 35 is not moved forward, and the carriage stops in this column for the listing of the float item data. In other elevations, viz., posting, no-deposit and register total, cam 44 contacts this slide and, consequently, effects the skipping of this seventh column.

When the deposit amount is of the character which requires the listing of float item data, the operator depresses the deposit key after the amount of the deposit has been indexed in the keyboard. This causes the amount to be printed and simultaneously relatches cam 44 in its deposit elevation. The carriage then tabulates to the fifth column where a blank cycle is taken, then tabulates to the sixth column where the first new balance is printed, thence to the float item column where the carriage will now be stopped since cam 44 is held in alignment with slot 121. The float item amounts are indexed on the keyboard and the motor bar depressed to cause their printing in the customary manner.

In these operations where the carriage is stopped in the float item column, it is necessary, after operating in this column, to take a blank cycle before the new balance is printed on the statement stub. The magazine in the eighth column is provided to accomplish this. A control slide 35, similar to the control slide of the float item magazine, is provided on this eighth column magazine, and is provided with a skip cam 42 at its forward end and a slot 122 similar to slot 121 at its rear end. When cam 44 occupies its posting, no-deposit and register total elevations, this slide is operated, and thereby effects the skipping of this column. When, however, cam 44 is latched in its deposit elevation, and the carriage enters this ting its retractable motor repeat lug to remain operative and thereby initiate a blank cycle. After this, the total is taken from the crossfooter, as in other posting operations.

It will be noted that by the provision of latches 85 and 86 the operator is relieved of the necessity of holding the deposit and no-deposit keys depressed to accomplish skip tabulating, float item stop, and sub-total printing of the second new balance operations. The self-latching of the latches and the automatic release thereof by stud 95 relieves the operator of exercising precise judgment in the manipulation of the keys to effect a desired operation. By this arrangement, chance of error is reduced, the time required for a posting run is shortened and the operator is allowed more time for handling the paper. In brief, efficiency of the machine operation is materially increased.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow.

What is claimed is:

1. In a machine of the class described having a traveling carriage movable in one direction on a working stroke and in the opposite direction on a return stroke, tabulating mechanism to control movement of the carriage to a plurality of columnar positions during the working stroke, means to control column skipping, the means including two manipulative elements, an adjustable member mounted on a stationary part of the machine, connections between the adjustable member and the manipulative elements whereby operation of the manipulative elements may move the adjustable member to different positions, means for latching the adjustable member in either adjusted position, and an element carried by the carriage to unlatch the adjustable member after it is adjusted by either manipulative element.

2. In a machine of the class described, a traveling carriage movable to a plurality of columnar positions, tabulating mechanism to control movement of the carriage from column to column, a member mounted on a stationary part of the machine and adjustable to two positions away from a normal position, means acting on the tabulating mechanism to cause one column to be skipped when the member is in one of its moved positions, means acting on the tabulating mechanism to cause another column to be skipped when the member is in its other moved position, means movable to and latchable in different positions to set the member in either of its out of normal positions, and means controlled by the carriage for releasing the said latchable means.

OSCAR J. SUNDSTRAND.
WALTER A. ANDERSON.